(12) United States Patent
Arai

(10) Patent No.: US 7,019,215 B2
(45) Date of Patent: Mar. 28, 2006

(54) WIRING HARNESS CLAMP

(75) Inventor: Hiroaki Arai, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/481,330

(22) PCT Filed: Jul. 4, 2002

(86) PCT No.: PCT/JP02/06817

§ 371 (c)(1),
(2), (4) Date: Jul. 7, 2004

(87) PCT Pub. No.: WO03/005518

PCT Pub. Date: Jan. 16, 2003

(65) Prior Publication Data

US 2004/0238203 A1      Dec. 2, 2004

(30) Foreign Application Priority Data

Jul. 5, 2001    (JP)    ............................. 2001-204965

(51) Int. Cl.
*H02G 1/00*    (2006.01)

(52) U.S. Cl. ................ 174/72 A; 174/135; 174/138 G; 174/154

(58) Field of Classification Search ............. 174/72 A, 174/135, 138 G, 43, 154; 248/71, 68.1, 74.2, 248/73
See application file for complete search history.

(56) References Cited

FOREIGN PATENT DOCUMENTS

| JP | 09-308057 | * 11/1997 |
|---|---|---|
| JP | 2000-115966 | * 4/2000 |

* cited by examiner

*Primary Examiner*—Jinhee Lee
(74) *Attorney, Agent, or Firm*—Finnegan, Henderson, Farabow, Garrett & Dunner, L.L.P.

(57) ABSTRACT

A wiring harness clamp is provided with a main body, a locking projection projected from the main body, and a pair of resilient latch arms extended from both sides of a top surface of the locking projection directed to the main body. Each of the resilient latch arm includes a latch portion including a guiding bevel at the distal end thereof. When the locking projection is inserted to a mounting hole of a panel, the latch portions are engaged with a peripheral border of the mounting hole. When the main body is pulled up so that the guiding bevel abuts the peripheral border, the resilient latch arms are elastically bent so as to cancel the engagement.

2 Claims, 5 Drawing Sheets

WIRING HARNESS CLAMP

TECHNICAL FIELD

The present invention relates to a wiring harness clamp with which the wiring harness is installed to an automobile body and such, and more particularly to a wiring harness clamp which is easy to be uninstalled when the automobile is scrapped for recycling.

BACKGROUND ART

A clamp provided with a main body and a locking projection for fixing to a panel of an automobile body, which is projected from the main body, is proposed as such a wiring harness clamp. The locking projection is provided with a pair of resilient latch arms.

A wiring harness and the main body are wound together with a tape so that the wiring harness is fixed to the main body. When the locking projection is inserted to a mounting hole of a panel, the resilient latch arms are elastically bent so that the locking projection can pass through the mounting hole. Thereby latch portions of the resilient latch arms are engaged with a peripheral border of the mounting hole. According to such an operation, the wiring harness is fixed to the panel and is prevented from displacing.

DISCLOSURE OF INVENTION

In view of natural resource conservation, a design intended for easy recycling is preferred for many kinds of products. For recycling, a product must be disintegrated and sorted according to types of materials. In a case of the proposed wiring harness clamp, though the wiring harness may be recycled by cutting the tape which fixes the wiring harness to the clamp, the clamp is left on the panel. It is necessary to further disintegrate the clamp and the panel for recycling. There is a problem that the proposed clamp is not easy to separate from the panel.

The present invention is accomplished in view of the problem described above and the object is to provide a wiring harness clamp which is easy to be installed and uninstalled.

According to the first aspect of the present invention, the wiring harness clamp is provided with a main body, a locking projection projected from the main body, and a pair of resilient latch arms extended from both sides of a top surface of the locking projection directed to the main body. Each of the resilient latch arms includes a latch portion including a guiding bevel at the distal end thereof. When the locking projection is inserted to a mounting hole of a panel, the latch portions are engaged with a peripheral border of the mounting hole. When the main body is pulled up so that the guiding bevel abuts the peripheral border, the resilient latch arms are elastically bent so as to cancel the engagement.

The latch portions are forced outward by the resilient latch arms so that the engagement of the latch portions and the peripheral border of the mounting hole is not cancelled when the wiring harness clamp is pulled in a direction vertical to the panel. On the contrary, when one side of the wiring harness running from one to another side of the wiring harness clamp is pulled apart from the panel, the guiding bevel abuts the peripheral border of the mounting hole so that the resilient latch arm is elastically bent to be receding. Thereby the engagement of the latch portion and the peripheral border of the mounting hole is easily can-celled. The wiring harness clamp is ensured to be installed to the panel and is easily uninstalled with such a simple procedure.

According to the second aspect of the present invention, each of the latch portions is further provided with a pair of ridges running along both edges thereof in integral manner respectively and each of tip ends of the ridges opposed to the main body is provided with a guiding edge. The ridges make insertion of the wiring harness clamp to the mounting hole of the panel smoother.

BEST MODE FOR CARRYING OUT THE INVENTION

Figure 1:
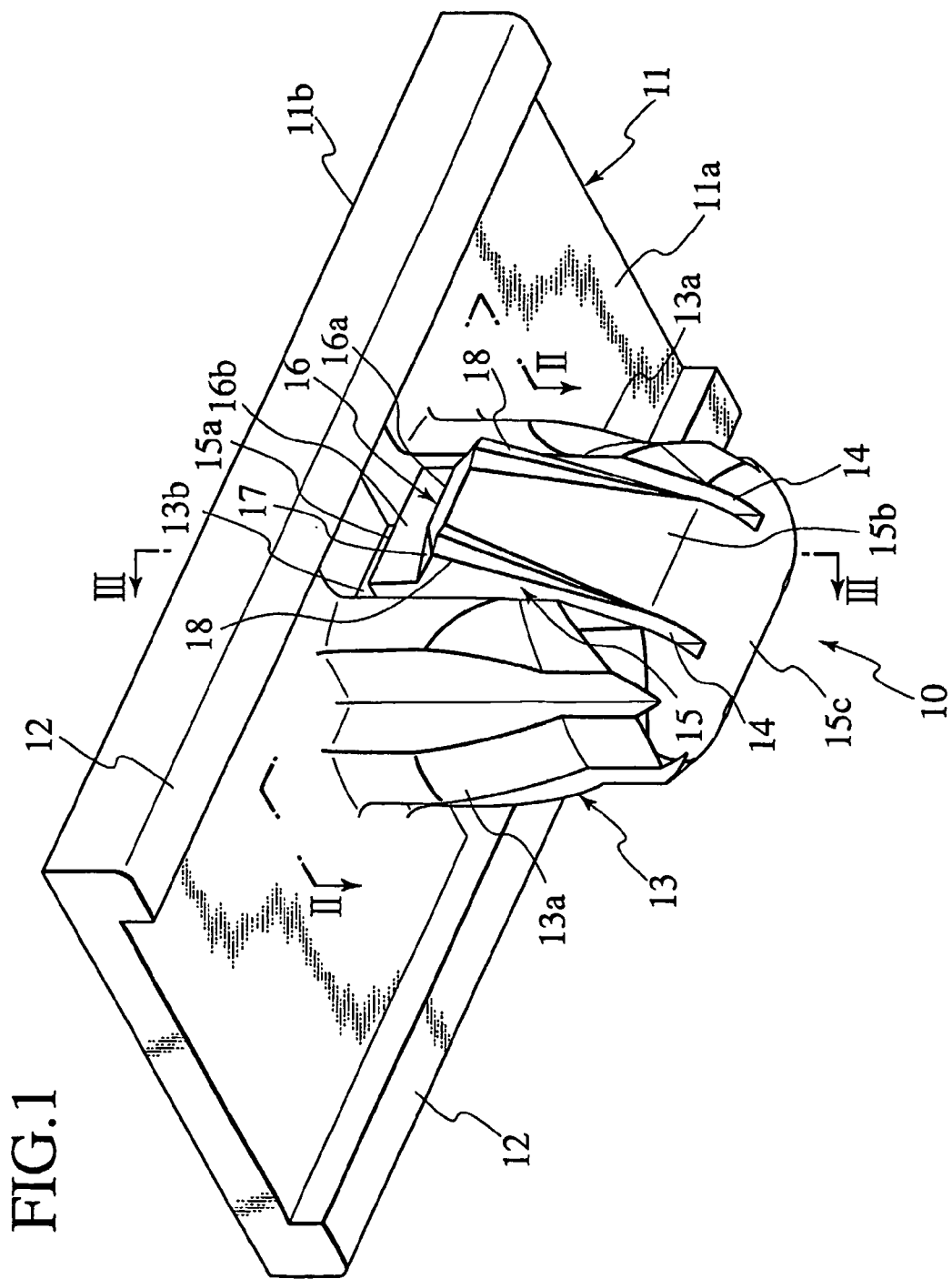
FIG. 1 is a perspective view of the wiring harness clamp according to an embodiment of the present invention.

A wiring harness clamp 10 is provided with a main body 11 and a locking projection 13 integrally formed on the substantial center thereof as shown in FIG. 1. The locking projection 13 is provided with a pair of resilient latch arms 15 on the both sides thereof and the resilient latch arms 15 are respectively extended from the top surface of the locking projection 13 directed to the main body 11. Each of the resilient latch arms 15 includes a latch portion 16 in a protruded manner therefrom so as to be installed to a panel 9.

The main body 11 is a substantially rectangular plate-shape having the same width as a wiring harness 7. A pair of bars 12 are integrally projected from a rear side opposed to the panel 9 and is respectively along the longer edge thereof. The wiring harness 7 is closely attached to a counter side of the bars 12 and the wiring harness 7 and the main body 11 are wound together with a tape 8 so as to be fixed.

Figure 2:
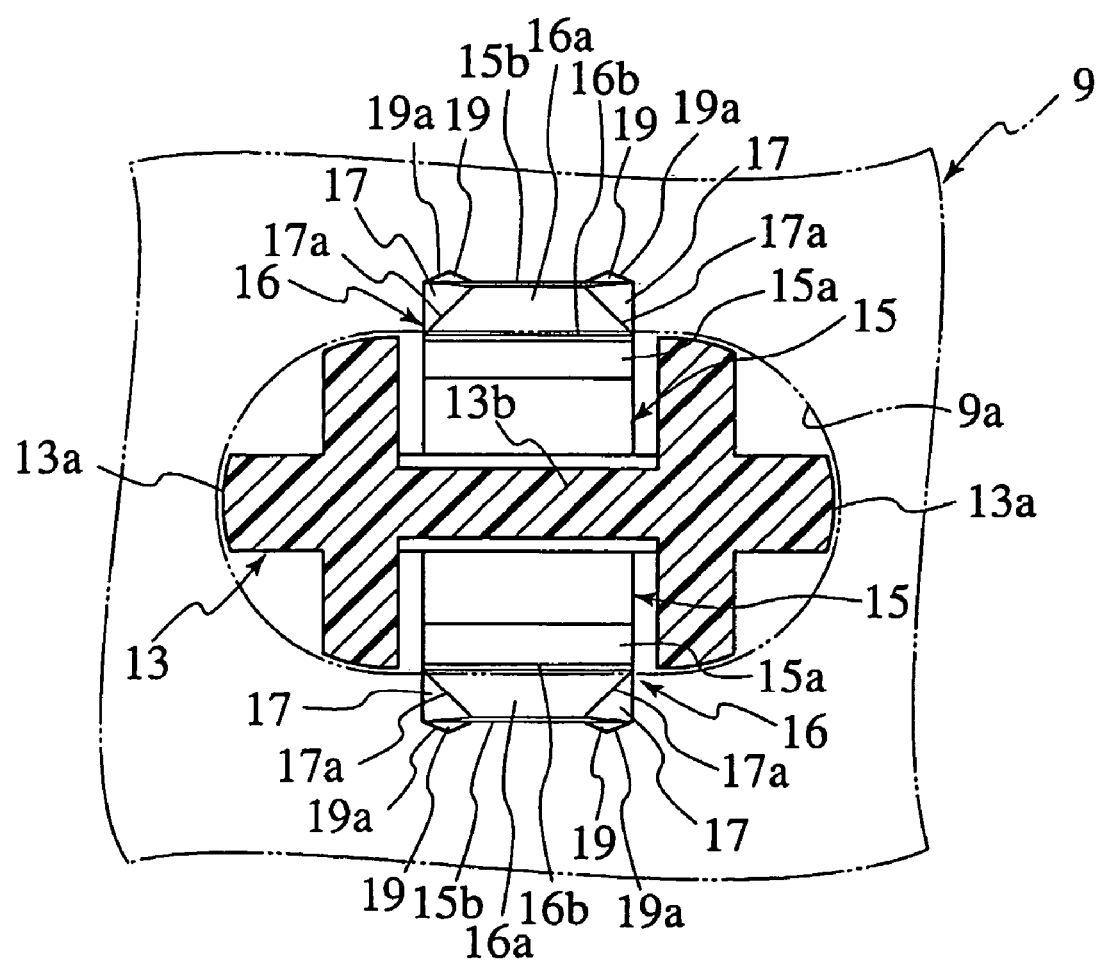
FIG. 2 is a sectional view of the wiring harness clamp taken along a line II—II in FIG. 1.
Figure 3:
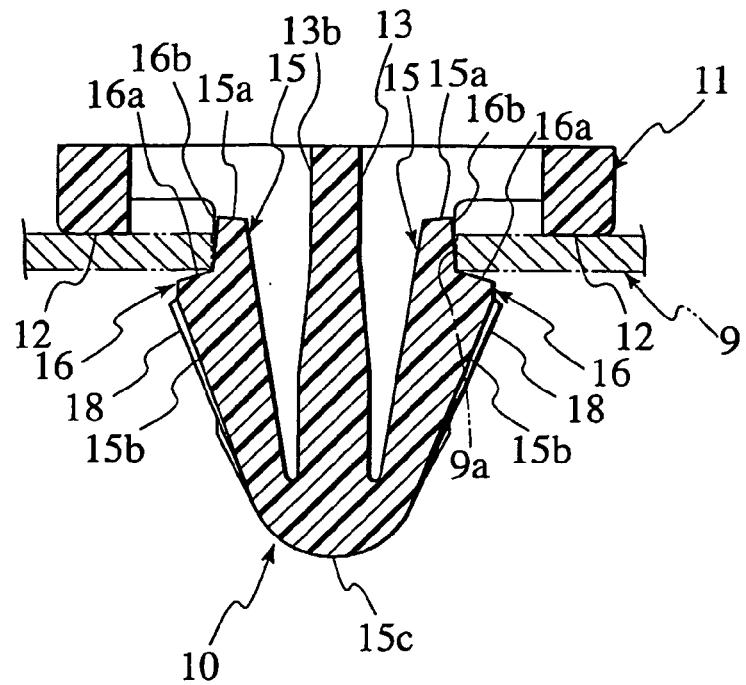
FIG. 3 is a sectional view of the wiring harness clamp taken along a line III—III in FIG. 1.
Figure 4:
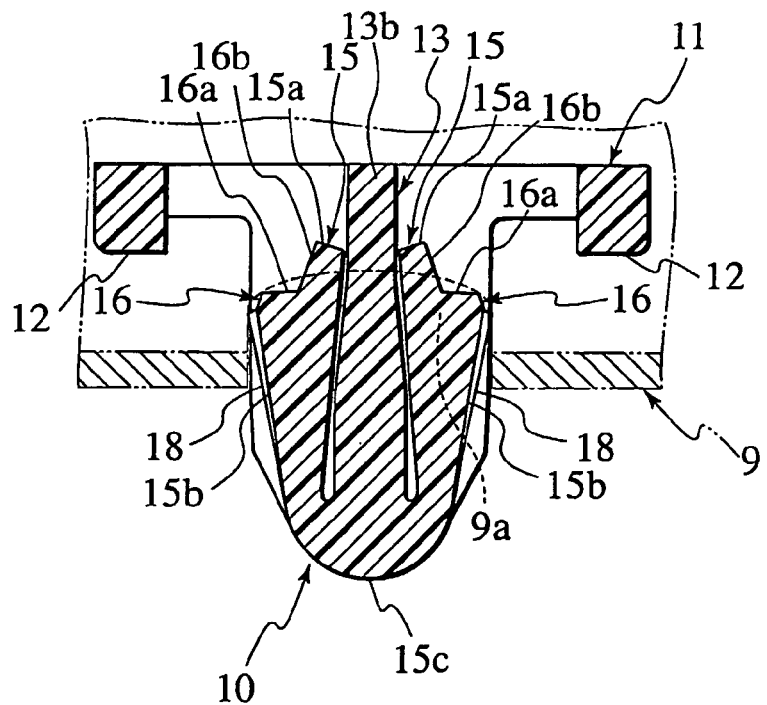
FIG. 4 is a sectional view of the wiring harness clamp showing a state in which the resilient latch arms pass through the mounting hole, showing the same section as FIG. 3.
Figure 7:
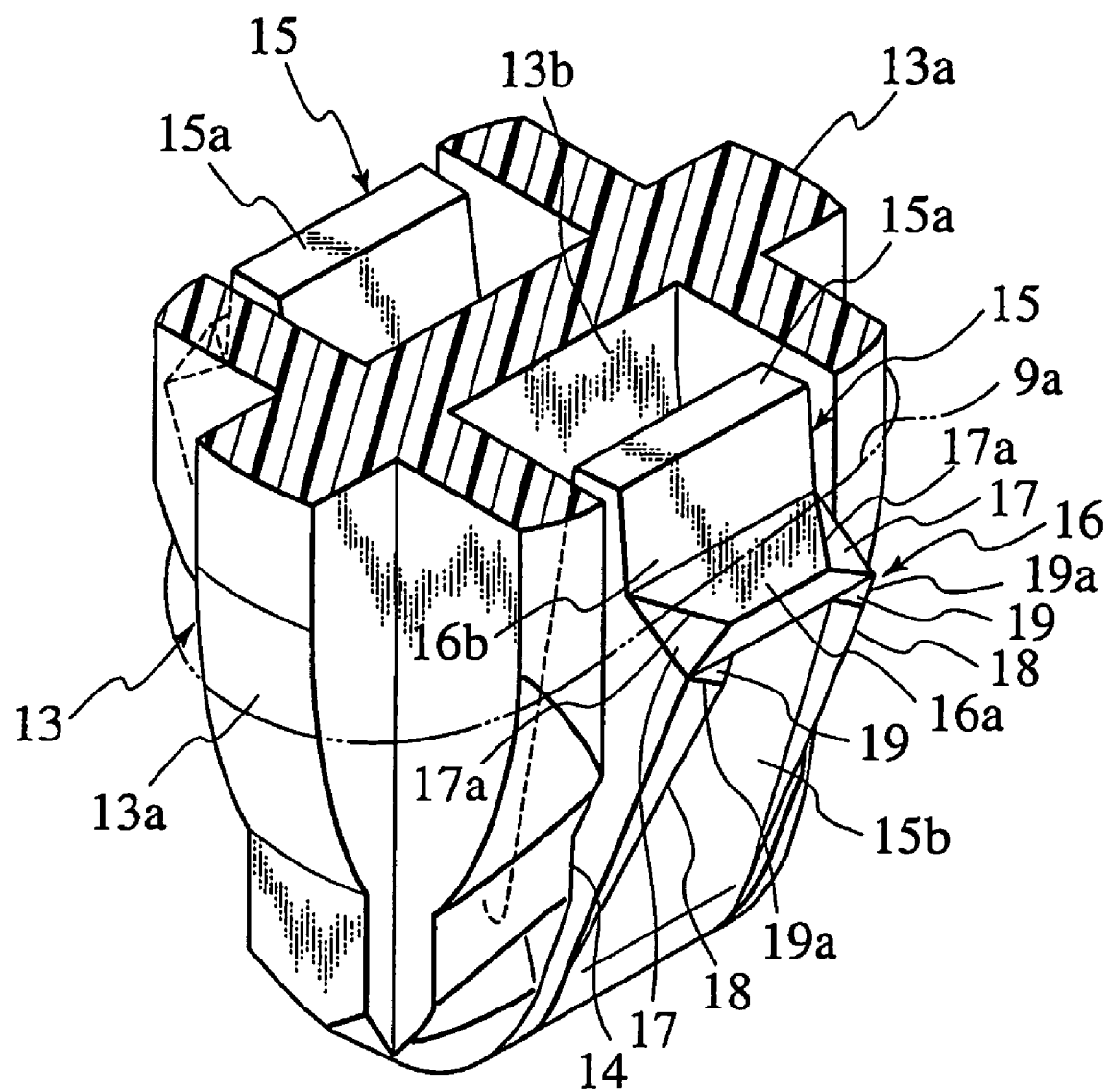
FIG. 7 is a partially sectional view of the wiring harness clamp showing a vicinity of the locking projection of the wiring harness clamp.

A cross-section of the locking projection 13 substantially has an H-shape as shown in FIGS. 2 and 7. Proximal ends 15*c* of the resilient latch arms 15 are integrally connected to the top surface of the locking projection 13 and are extended therefrom directed to the main body 11 along to the locking projection 13. As the sectional view shown in FIG. 3, the pair of latch arms 15 have an inverted V-shape. A pair of slits 14 are respectively provided between the resilient latch arms 15 and the locking projection 13 so that movement of the resilient latch arms 15 to a center portion 13*b* of the locking projection 13 is not interfered.

Outside surfaces of the respective resilient latch arms 15 are formed to be slanted surfaces 15*b* and surfaces of the latch portions 16 opposed to the main body 11 are formed to be abutting surfaces 16a. Each of the resilient latch arms 15 is further provided with a tip side surface 16b beyond the abutting surface 16a to a side of a tip end 15a thereof. When the locking projection 13 is inserted to a mounting hole 9a of the panel 9, the abutting surface 16a and the bar 12 clip a peripheral border of the mounting hole 9a therein so that the wiring harness clamp 10 is fixed to the panel 9.

A pair of guiding bevels 17 are formed on both sides of the abutting surface 16a of each the latch portion 16 as shown in FIG. 7. Each of the guiding bevels 17 has a triangular surface and comprises a guiding edge 17a on the side of the abutting surface 16a.

A pair of ridges 18 are integrally protruded from the slanted surface 15b of the resilient latch arm 15 on both sides thereof, in a triangular pyramid shape, as shown in FIGS. 1 and 7. The ridges 18 are respectively stretched from the proximal end 15c to a distal end of the slanted surface 15b. Ends of the ridges 18 on a side of the latch portion 16 respectively comprise bevels 19 each having a guiding edge 19a on an outside thereof.

The mounting hole 9a of the panel 9 to which the wiring harness clamp 10 is installed is formed to be an oval shape so as to encompass the locking projection 13 as shown in FIG. 2.

A method of installing the wiring harness 7 and the wiring harness clamp 10 to the panel 9 is described hereinafter according to the embodiment of the present invention. After the wiring harness 7 is fixed to the wiring harness clamp 10 with the tape 8, the proximal ends 15c of the pair of resilient latch arms 15 and the side portions 13a of the locking projection 13 are inserted to the mounting hole 9a of the panel 9. Two pairs of ridges 18 smoothly guide the resilient latch arms 15 into the mounting hole 9a.

When further pressing the pair of resilient latch arms 15 into the mounting hole 9a of the panel 9, the pair of resilient latch arms 15 are elastically bent and get close to each other so as to pass through the mounting hole 9a. Subsequently the latch portions 16 are engaged with the peripheral border of the mounting hole 9a. The abutting surfaces 19a and the bars 12 clip the peripheral border of the mounting hole 9a and the resilient latch arms 15 force the latch portions 16 toward the peripheral border of the mounting hole 9a so that the wiring harness clamp 10 is assured to be fixed to the panel 9 and prevented from displacing.

Figure 5:
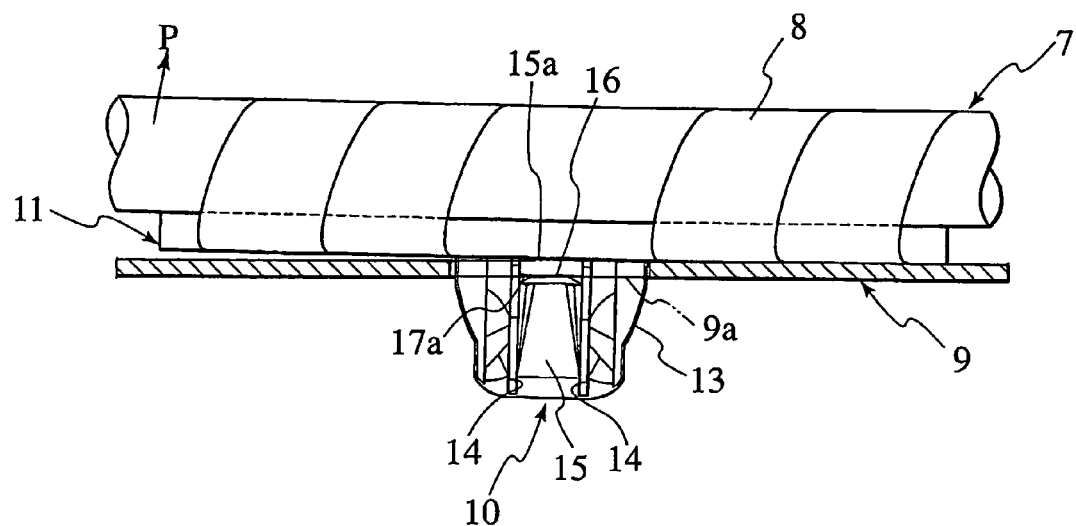
FIG. 5 is a partially sectional view of the wiring harness clamp showing a state in which the wiring harness clamp is installed to the panel.
Figure 6:
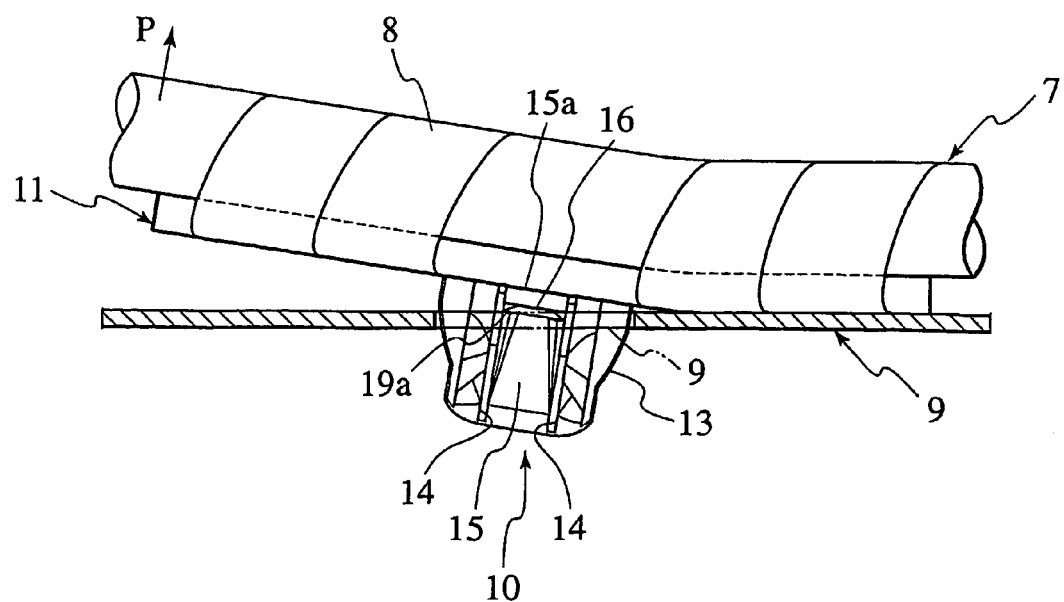
FIG. 6 is a partially sectional view of the wiring harness clamp showing a process of detaching the wiring harness clamp from the panel.

The wiring harness clamp 9 is uninstalled from the panel 9 according to a procedure as described hereinafter. One side of the wiring harness 7 fixed to the main body 11, as shown in FIGS. 5 and 6, in which the left side is exemplified, is pulled away from the panel 9 in a direction indicated by an arrow P shown in the figures. The guiding edges 17a are pressed by the peripheral border of the mounting hole 9a so that the pair of resilient latch arms 15 are elastically bent and get close to each other. Thereby the latch portions 16 pass through the mounting hole 9a of the panel 9 and the wiring harness clamp 10 and the wiring harness 7 are uninstalled from the panel 9.

As described above, the wiring harness clamp 10 is easily uninstalled from the panel 9 simply by pulling one side of the wiring harness 7 away from the panel 9. The wiring harness clamp 10 may be easily uninstalled and recycled.

Although the invention has been described above by reference to certain embodiments of the invention, the invention is not limited to the embodiments described above. Modifications and variations of the embodiments described above will occur to those skilled in the art, in light of the above teachings. For example, though installation of the wiring harness clamp 10 to the panel 9 of automobile is exemplified in the above description, objects of installation are not limited to an automobile.

INDUSTRIAL APPLICABILITY

As described above, the wiring harness clamp according to the first aspect of the present invention is provided with a pair of latch portions each having a guiding bevel. When pulling one side of the wiring harness fixed to the main body of the wiring harness clamp, the guiding bevels abut the peripheral border of the mounting hole of the panel so that the resilient latch arms are elastically bent and the engagement is cancelled. It is possible to uninstall the wiring harness clamp from the panel with such a simple procedure in a short time. Furthermore, because the latch portions are forced outward by the resilient latch arms, the engagement may not be cancelled when the wiring harness clamp is pulled vertically with the panel.

According to the second aspect of the present invention, each of the latch portions is further provided with a pair of ridges running along both edges thereof in integral manner respectively and each of tip ends of the ridges opposed to the main body is provided with a guiding edge. The ridges make insertion of the wiring harness clamp to the mounting hole of the panel smoother. As well as uninstallation of the wiring harness clamp from the panel with a simple procedure in a short time, installation of the wiring harness clamp is easier than the first aspect.

The invention claimed is:

1. A wiring harness clamp comprising:
   a main body;
   a locking projection protruded from the main body; and
   a pair of resilient latch arms extended from both sides of a top surface of the locking projection directed to the main body, each of the latch arms comprising a latch portion including guiding bevels formed on both sides of a distal end thereof;
   wherein each of the guiding bevels has a triangular surface comprising a first guiding edge;
   wherein the locking projection is inserted to a mounting hole of a mounting object so that the latch portions are engaged with a peripheral border of the mounting hole and are prevented from displacing; and
   wherein the resilient latch arms are elastically bent to cancel the engagement when the main body is pulled so that the guiding bevels abut the peripheral border.

2. The wiring harness clamp according to claim 1, wherein:
   each of the latch portions further comprises a pair of ridges running along both edges thereof in a integral manner and each of tip ends of the ridges opposed to the main body comprises a second guiding edge.

* * * * *